(12) United States Patent
Joppe et al.

(10) Patent No.: US 9,327,440 B2
(45) Date of Patent: May 3, 2016

(54) DEVICE AND METHOD FOR PRODUCING FILM TUBING

(75) Inventors: Markus Joppe, Mettingen (DE); Karsten Golubski, Haltern am See (DE); Juergen Linkies, Lienen (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 630 days.

(21) Appl. No.: 13/502,570

(22) PCT Filed: Oct. 27, 2010

(86) PCT No.: PCT/EP2010/066248
§ 371 (c)(1),
(2), (4) Date: Apr. 18, 2012

(87) PCT Pub. No.: WO2011/054715
PCT Pub. Date: May 12, 2011

(65) Prior Publication Data
US 2012/0200001 A1 Aug. 9, 2012

(30) Foreign Application Priority Data
Nov. 9, 2009 (DE) .......................... 10 2009 046 539

(51) Int. Cl.
*B29C 47/22* (2006.01)
*B29C 47/88* (2006.01)
*B29C 47/00* (2006.01)
*B29C 47/92* (2006.01)

(52) U.S. Cl.
CPC ......... *B29C 47/8835* (2013.01); *B29C 47/0021* (2013.01); *B29C 47/883* (2013.01); *B29C 47/92* (2013.01); *B29C 2947/926* (2013.01); *B29C 2947/92571* (2013.01); *B29C 2947/92647* (2013.01); *B29C 2947/92952* (2013.01)

(58) Field of Classification Search
CPC    B29C 47/0026; B29C 47/005; B29C 47/883; B29C 47/8835; B29C 47/92; B29C 2947/92952; B29C 2947/92571; B29C 2947/92647
USPC ....... 264/209.8, 209.1; 425/72.1, 192 R, 380, 425/466
See application file for complete search history.

(56) References Cited

U.S. PATENT DOCUMENTS

| 3,819,790 | A | * | 6/1974 | North | ............................ 264/560 |
| 4,818,467 | A | | 4/1989 | Audureau et al. | |
| 4,826,414 | A | | 5/1989 | Planeta | |

(Continued)

FOREIGN PATENT DOCUMENTS

| CA | 2 155 135 | 2/1996 |
| DE | 2 062 789 | 7/1971 |

(Continued)

*Primary Examiner* — James Sanders
*Assistant Examiner* — Ninh Le
(74) *Attorney, Agent, or Firm* — Jacobson Holman, PLLC (57) ABSTRACT

A device for the production of film tubes includes a die head having an annular nozzle, from which a plastic melt for producing the film tube can be extruded in a transport direction (y), a fluid-application device, which is annular in shape at least in certain regions and which follows the die head in the transport direction (y) and which surrounds the film tube annularly, and via which a fluid can be guided toward the film tube, and a ring, the diameter of which is larger than the annular nozzle of the fluid-application device. The device has an adjusting device, via which the ring can be adjusted in height relative to the fluid-application device.

15 Claims, 7 Drawing Sheets

(56) References Cited

U.S. PATENT DOCUMENTS

| | | | | |
|---|---|---|---|---|
| 5,683,727 A * | 11/1997 | Kahlen | ........................ | 425/72.1 |
| 2003/0110595 A1* | 6/2003 | Collins et al. | .................. | 24/3.12 |
| 2008/0015592 A1* | 1/2008 | Long et al. | ...................... | 606/69 |
| 2008/0258325 A1* | 10/2008 | Zimmermann | .............. | 264/40.6 |

FOREIGN PATENT DOCUMENTS

| | | |
|---|---|---|
| GB | 1 318 927 | 5/1973 |
| JP | 59-16721 | 1/1984 |
| JP | 10-272692 | 10/1998 |
| JP | 2000-25109 | 1/2000 |

* cited by examiner

VII - VII

DEVICE AND METHOD FOR PRODUCING FILM TUBING

CROSS-REFERENCE TO RELATED APPLICATIONS

This is a national stage of PCT/EP10/066248 filed Oct. 27, 2010 and published in German, which claims the priority of German number 10 2009 046 539.1 filed Nov. 9, 2009, hereby incorporated by reference.

BACKGROUND OF THE INVENTION

1. Field of Invention

The invention relates to a device for the production of film tubes as defined in the generic clause of claim 1 and a method as defined in the generic clause of claim 8.

2. Description of the Prior Art

Film tubes are usually produced by means of blow-extrusion devices and methods. For this purpose, a die head is used, to which one or more melt streams made of plasticized plastics are supplied. Each melt stream is distributed in the form of a ring as uniformly as possible in the die head. If several melt streams are supplied, the individual melt layers are combined together. The thus molded single-layer or multilayered tube leaves the die head through an annular nozzle in a transport direction.

In order to cool down the film tube as rapidly as possible and bring it to a stable form, at least one fluid-application device, which surrounds the film tube annularly at least in certain regions, follows the die head in the transport direction. Air is frequently provided as the fluid, but other fluids, more particularly gaseous ones, are also possible. The fluid can be cooled or heated in sectors in order to be able to locally influence the thickness of the film tube. Its flow rate can also be modified.

The fluid is likewise conveyed by the fluid-application device and also by the film tube in the transport direction. After the fluid leaves the fluid-application device, a pressure equalization with the ambient air takes place, so that the cooling effect reduces rapidly.

The fluid-application device usually has a very limited overall height since the film tube is expanded in the radial direction by means of an internal pressure that is slightly higher than the ambient pressure. This determines the size of the film tube.

In order to increase the cooling effect of the fluid, the document CA 2 155 135 C suggests the provision of a ring that concentrically surrounds the annular region of the fluid-application device and projects above the same in the transport direction. Specifically, this means that the ring, which can be made of Plexiglas, is attached to the top end of the annular region. The ring can be followed by an additional ring in each case. Each additional ring has a larger diameter as compared to the preceding ring and is kept at a distance from the latter in the radial direction by means of spacers and is attached to the top edge of the preceding ring by means of screws. As a result of these rings, the cooling air remains longer on the film tube and the cooling effect is thus improved. Open regions are provided between the annular region and the ring or between two rings, and a pressure equalization can further take place through these open regions. Usually, additional air is drawn in through these open regions (known as the chimney effect) that can unfold an additional cooling effect. Since more heat per unit of time can now be released from the film tube, the production rate of the film tube is increased.

However, the solution suggested in CA 2 155 135 suffers from the shortcoming that the rings can be adjusted only by dismounting and mounting other rings when the tube size is changed. Furthermore, the annular nozzle of the die head is poorly accessible, which is a disadvantage particularly at the start of production when the melt oozing out of the annular nozzle must be pulled off manually.

SUMMARY OF THE INVENTION

It is therefore the object of the present invention to suggest a device described below and a method for the production of film tubes that overcome these disadvantages.

This object is achieved by a device and by a method as described herein.

Thus an adjusting device is provided, by means of which the ring can be adjusted in height relative to the fluid-application device. In this way, the ring surrounding the annular portion of the fluid-application device can first be held in a position in which said ring does not or does not substantially project above the annular portion of the fluid-application device. Thus the annular nozzle is easily accessible, which is important for the start of production. As soon as production has started successfully and the film tube has achieved a sufficiently stable shape, the ring can be shifted in the transport direction of the film tube by means of the adjusting device. Since the transport direction is usually vertical and is bound upward, mention is made of the term "height adjustment" in the context of the adjustment process for the sake of convenience. The amount of adjustment can be selected in dependence of the diameter of the blown film. If the film tube is made of the same film material, the diameter is larger at a higher internal pressure than at a lower internal pressure. In the first case, the ring is then not shifted as far as in the second case. Thus the optimum cooling effect can be achieved for blown film of any diameter by means of the device of the invention. It is now no longer necessary to replace the ring for enabling an adjustment of the ring to the diameter of the blown film.

In a further advantageous embodiment of the invention, provision is made for the ring to be surrounded concentrically by an additional ring in each case. Each ring can be adjusted in height relative to the fluid-application device and relative to the ring surrounded by this ring by means of the adjusting device. A separate adjusting device can be assigned to each ring that adjusts the ring relative to the surrounded ring. In this case, the heights of the individual rings are selected such that they can adapt effectively to the shape of the blown film, which results in a good cooling effect. However, provision can also be made for a common adjusting device that shifts all the rings at the same time. Such an adjusting device can be easier to construct mechanically.

In an advantageous embodiment of the invention, provision is made for the adjusting device to comprise support members which extend in the transport direction of the film tube and which rest on the fluid-application device and/or the rings. The support members have inclined guide grooves that extend approximately in the form of a helix. Each ring comprises inwardly extending pins, and each pin engages in a guide groove. A height adjustment is carried out by means of a simple rotation of the ring. Since the rings are easily accessible from the outside, this type of adjustment can be carried out manually. Said adjustment can be carried out by a single individual.

It is further advantageous if each ring can be locked in place on the ring that it surrounds or on the fluid-application device. While there is no requirement of a locking mechanism for the rings in a simple embodiment as there is sufficient static friction, it is advisable to provide locking means. These locking means can include a clamping screw, a clamping element, a normal screw or a pin that can engage in a bore.

It is also advantageous if the guide grooves comprise groove extensions extending in the direction of the gravitational force. Thus the rings can be hooked into these groove extensions or snapped into place in the same. Locking means are not required in this case.

In a further, advantageous embodiment of the invention, there is at least one electromotor drive provided for the height adjustment, by means of which the ring or the rings can be adjusted in height. The electric motor can act upon, for example, the spindle or the spindle nut of a spindle/spindle nut combination. Many other mechanical, adjustable connections are also possible.

More particularly, it is possible that at least one electromotor drive is assigned to each ring. Thus the relative positions of the individual rings can be adjusted without manual intervention. It is advantageous to provide a plurality of electromotor drives when the device involves automated production of blown film. For example, the internal pressure of the blown film can be adjusted by a control device. The individual electric motors for positioning the rings can also be controlled according to these control instructions.

Additional exemplary embodiments of the invention are revealed in the figures and the following description.

BRIEF DESCRIPTION OF THE DRAWINGS

In the individual figures.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
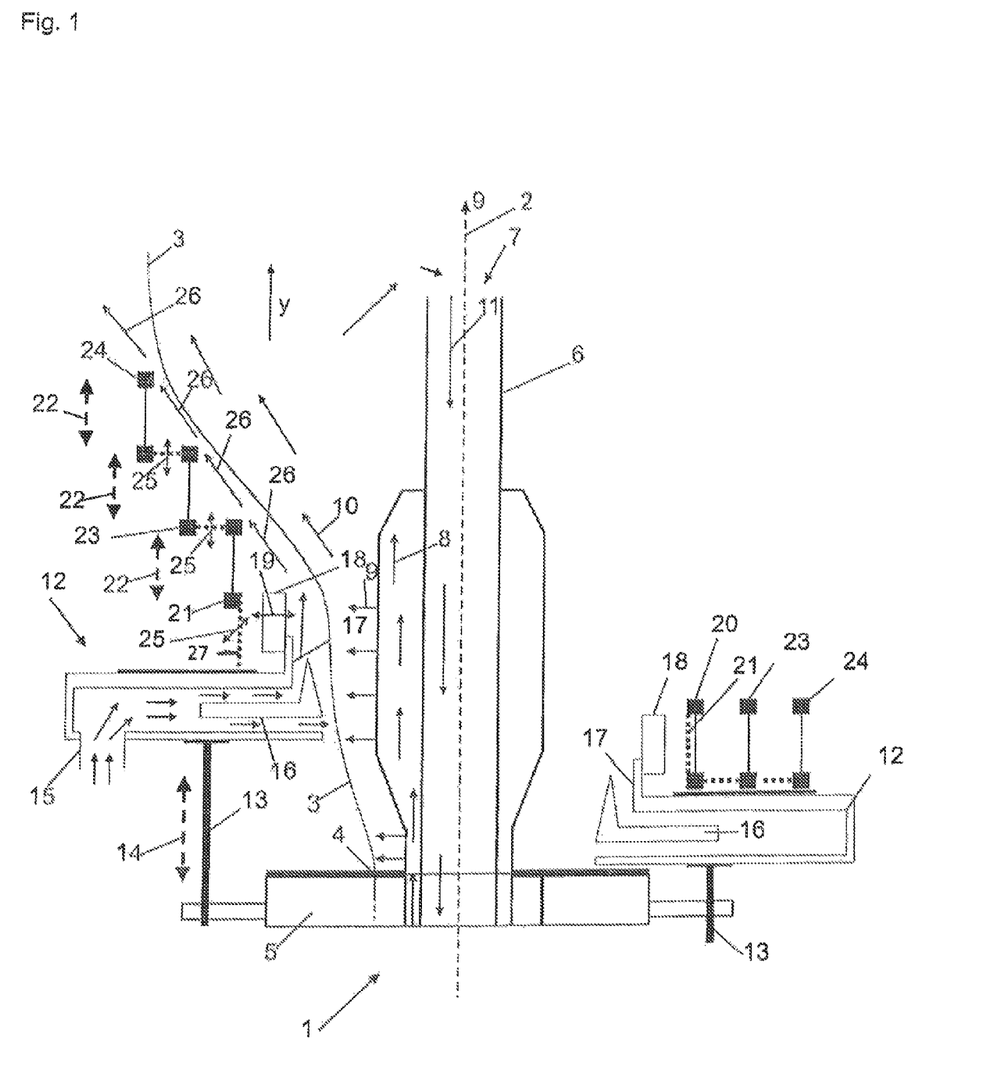
FIG. 1 is a schematic diagram of a device of the invention in a side view

FIG. 1 is a side view of a schematic diagram of a device 1 of the invention for the production of film tubes, the schematic diagram being bisected by the dashed line 2 denoted by the arrow. The left half shows the device during operation, whereas the right half shows the device of the invention in a non-operating state. The arrow at the top of the dashed line also shows the transport direction y of the film tube 3.

The left half of the figure shows the film tube 3 as it leaves the annular nozzle 4 of the die head 5. The film tube increases in width when viewed in the transport direction y. The film tube 3 can be stretched readily, that is, expanded in the radial direction in its unsolidified state as it leaves the nozzle 4. This is achieved by building up a slight positive pressure in the interior of the film tube 3. For this purpose, a so-called internal cooling device 6 is provided that starts from the die head and extends into the interior of the film tube 3. The air required is supplied by means of corresponding bores and/or lines in the die head 5. Cooling air is discharged from orifices made in the external periphery of the internal cooling device 6. The cooling air is directed at the internal wall of the film tube in order to achieve a cooling effect. The positive pressure causes the film tube to expand increasingly, as indicated by way of example by the shape of the film tube in the figure, until the tube reaches the so-called frost line. Air that has heated up as a result of this process is removed from the interior of the blown film by means of the air exhaust 7. The arrows 8, 9, 10, and 11 show the air flow.

An external cooling device 12 is disposed above the die head 5. Said external cooling device 12 extends completely around the film tube 3 and can be lifted relative to the die head 5 by lifting devices 13. The direction of movement in or against the transport direction y is denoted by the arrow 14. The left half of FIG. 1 shows the external cooling device in a lifted position. A coolant is supplied to the external cooling device 12 by means of supply pipes 15. The temperature of this coolant, preferably air, can be controlled in sectors in the manner known per se. The coolant stream can now be divided into smaller streams by various separators. A resulting first portion of the coolant stream can be guided at the wall of the film tube 3 at right angles thereto, while a second portion is deflected and guided in a direction extending parallel to the film tube 3.

The external cooling device 12 comprises an annular region 17 at the top end of which an annular border 18 is provided. This annular border is connected to the annular region of the external cooling device 12 by means of a thread (not shown in the figure). The annular border comprises orifices (not shown in detail), by means of which a pressure equalization can take place with the ambient air, as shown by the arrow 19.

The annular border 18 is surrounded by a first ring 20 that can be adjusted by means of an adjusting device 21 relative to the external cooling device 12 in and against the transport direction of the film tube 3 (see arrow 22). The adjusting device 21 is merely indicated by a dotted line in FIG. 1. Specific embodiments of the adjusting device are explained with reference to FIGS. 3 to 5. The adjusting device 21 is supported on the external cooling device 12. The ring 20 is followed by the rings 23 and 24, each of which has a larger diameter so that the rings encircle each other. The right half of FIG. 1 shows the rings 20, 23, 24 in their lowered position, in which they barely project above the annular border and thus do not restrict or do not considerably restrict access to the annular nozzle 4 of the die head 5. The left half of FIG. 1 shows that the rings 20, 23, 24 can be moved along the arrow 22. In the case illustrated, the ring 23 is supported on the ring 20, and the ring 24 on the ring 23. The supports 27 are in the form of open constructions and are therefore shown in the form of dotted lines. This means that wide regions between the ring 20 and the ring 23, and between the ring 23 and the ring 24, respectively, are open so that a pressure equalization can take place through these open regions. Depending on pressure conditions, the air can flow in one of two flow directions indicated by the double arrow 25. The air flow along the external periphery of the film tube 3 is shown by the arrow 26. The flow within the rings 20, 23, 24 usually results in a negative pressure at the open regions between the rings so that additional air is supplied through the open regions and this additional air ensures a further cooling effect.

Advantageously, the rings are made of Plexiglas so that the film tube 3 can be observed. The rings, however, can also be made of other plastics and also of metals such as aluminum, which is light by itself. Additional materials such as glass are also feasible, in principle. However, light materials are preferred.

Figure 2:
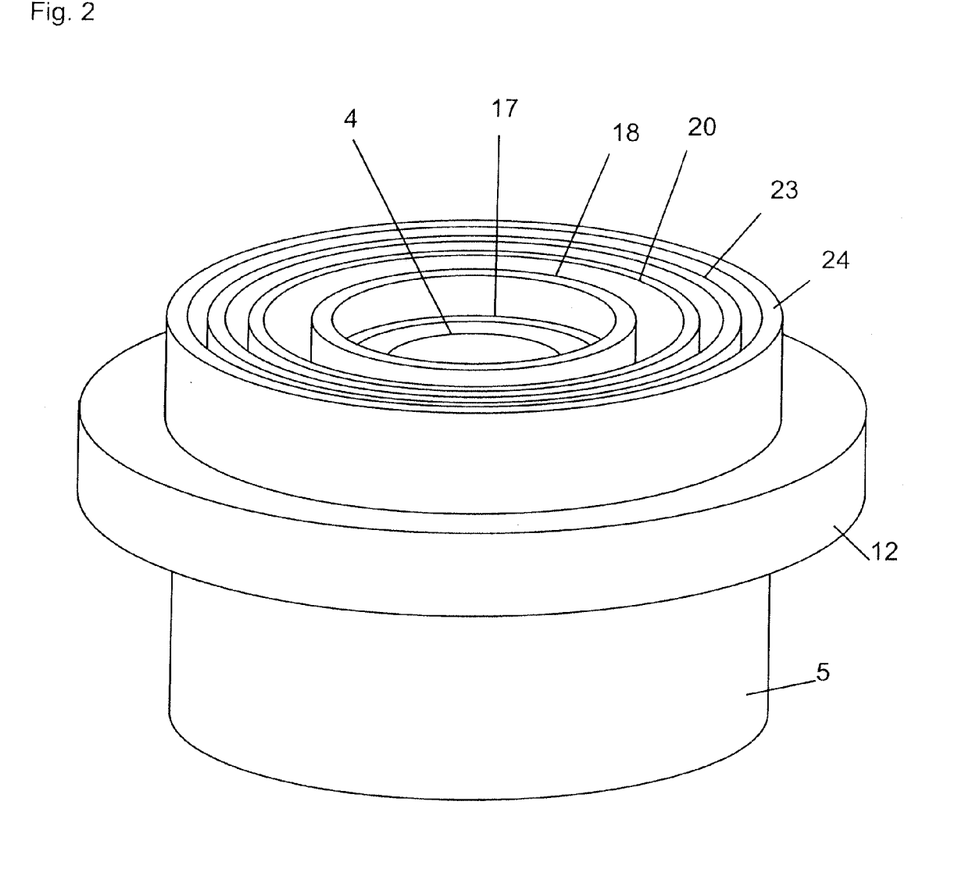
FIG. 2 is a perspective view of the device of the invention

FIG. 2 is a perspective view of the device of the invention as shown in the right half of FIG. 1, that is, all the rings 20, 23 and 24 are located in their lowered position. The annular nozzle 4 that can be accessed easily for starting the extrusion process and also for cleaning purposes can be seen in this illustration.

Figure 3:
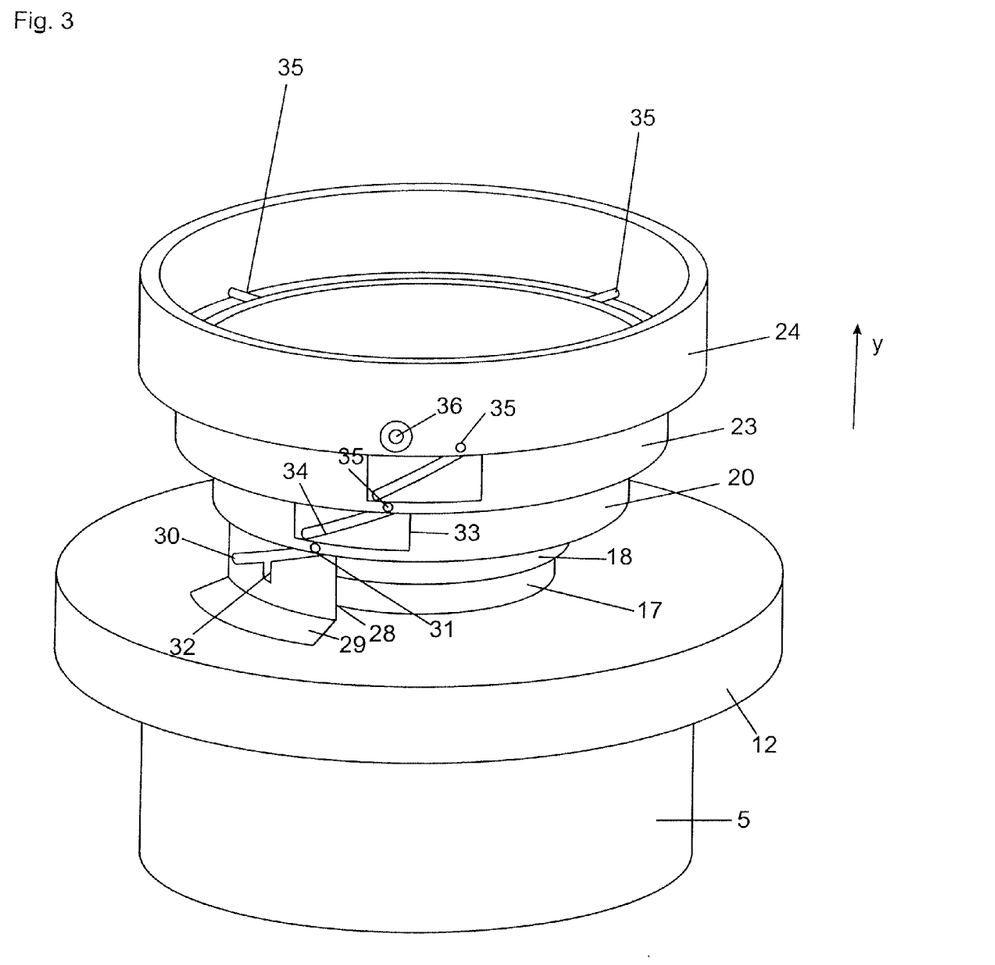
FIG. 3 is a further perspective view of the device of the invention

FIG. 3 shows a first embodiment of the adjusting device 21. A support plate 28 rests on the surface of the external cooling device. For this purpose, the plate 28 can comprise a beveled portion 29. Only one plate 28 is shown in the figure, but it is advisable to provide at least three, more particularly four, such plates 28. The plate 28 comprises a groove 30 extending upwardly at an angle. A pin 31 that is inserted into the wall of the ring 20 and that extends inwardly in the radial direction engages in this groove. By a rotation of the ring 20 counterclockwise, it is lifted so as to correspond to the course of the groove 30 at the same time. In order to prevent the ring 20 from slipping back into its initial position, the groove can be provided with a plurality of extensions, one 32 of which is shown in the figure. The groove extensions represent various snap-in stops and thus various heights that can be selected only discretely. The ring 20 carries a plate 33 that comprises a groove 34 which likewise extends upwardly at an angle and in which the pin 35 of the ring 23 engages. A plurality of plates 33 can be distributed on the periphery of the ring 20. The ring 23 can be locked in place on the ring 20 simply in that the internal periphery of the ring 23 presses against the plate 33 so that there results a static friction that is sufficient for securing the ring 23.

The ring 23 can also be provided with plates 33 that comprise grooves 34. The pins 35 of the ring 24 engage in these grooves 34. A further possibility of locking the ring is illustrated by means of the ring 24. In this case, a knob 36 is provided, by means of which a screw, which passes through a threaded hole, can be rotated against the ring 23 or against the plate 33 of the ring 23.

Various possibilities of locking the rings are illustrated in FIG. 3, and these possibilities are naturally applicable to all the rings.

The height of all the rings is adjusted by means of rotation. Since each ring is supported only by the nearest inner ring, the height of every ring can be adjusted independently. The heights of the rings can therefore be adjusted easily and optimally to suit the shape of the film tube 3 (not shown in this figure).

Figure 4:
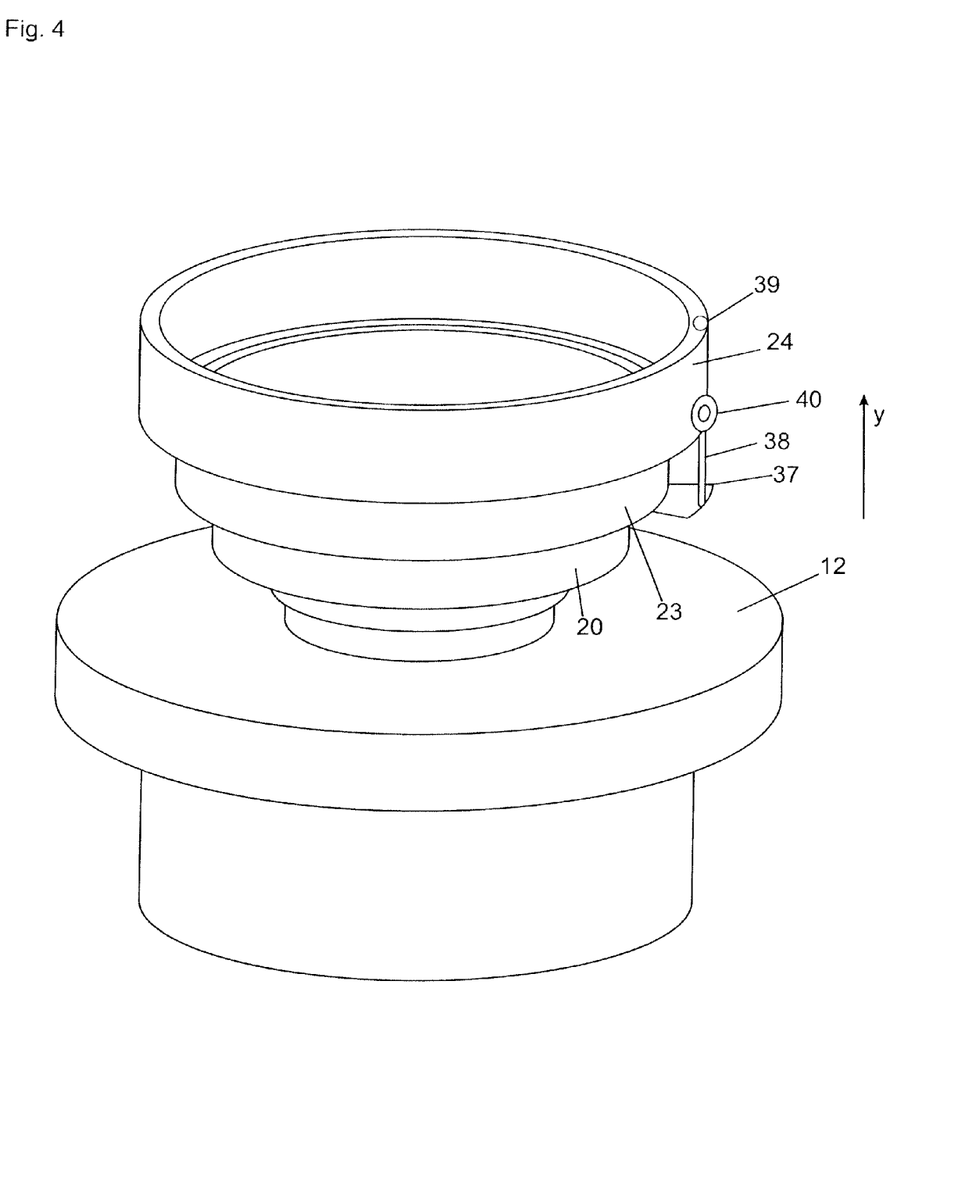
FIG. 4 is a perspective view of a further embodiment of the device of the invention

FIG. 4 shows an embodiment of the adjusting device. In this case, an outwardly protruding support piece 37 that is attached to the ring 23 supports a rod 38 that extends into a bore inserted in the ring 24, for example. For the purpose of height adjustment, the ring 24 can now be moved relative to the ring 23 in the y direction and locked in the desired position by means of the fixing screw 40. In an embodiment provided with an electric motor (not shown in the figure), the rod could be in the form of a threaded rod that is then set into rotation by the electric motor. The bore 39 would then be in the form of a threaded hole, into which the rod 38 is screwed. The rotation of the rod 38 results in an adjustment of the height of the ring 24. The electric motor could rest on the support piece 37. A plurality of such arrangements (not shown in the figure) would have to be provided on the rings 20 and 21 and on the external cooling device 12.

Figure 5:
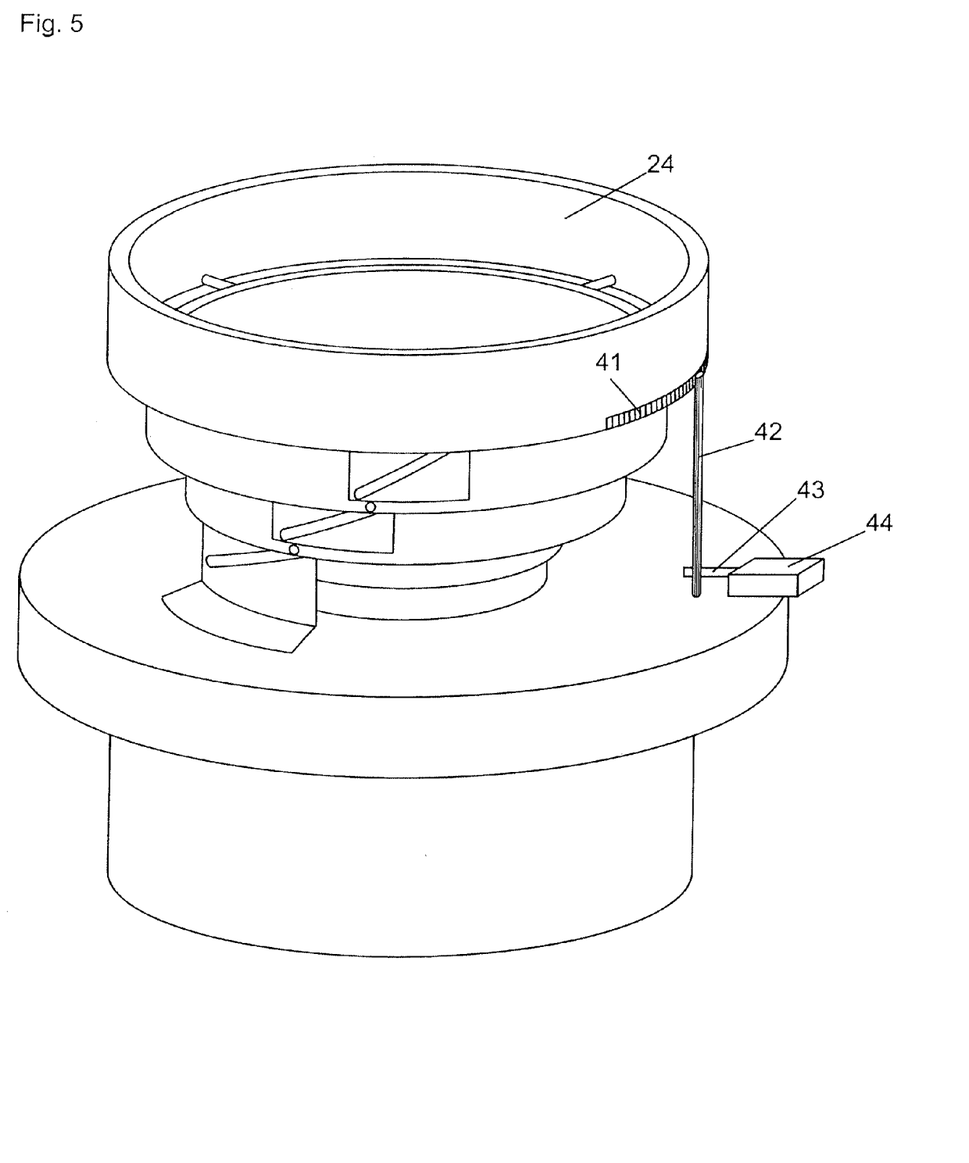
FIG. 5 is a perspective view of another embodiment of the device of the invention.

A further exemplary embodiment of the invention is shown in FIG. 5. The basic construction of the device corresponds to FIG. 3. In this case, the ring 24 comprises a toothed-ring segment 41 on its external surface that meshes with a shaft 42 that is in the form of a toothed wheel over its entire length. The shaft 42 is driven by a worm gear 43 that is set into rotation by the electric motor 44. A common drive system for all rings 20, 23 and 24 is made possible by means of this embodiment. Starting from the lowered position, the ring 24 is rotated first and thus lifted. Then the ring 24 entrains the ring 23 and then the ring 23 entrains the ring 20 until all the rings are lifted. In order to enable the individual adjustment of each ring, the drive system shown can be provided for every ring.

Figure 6:
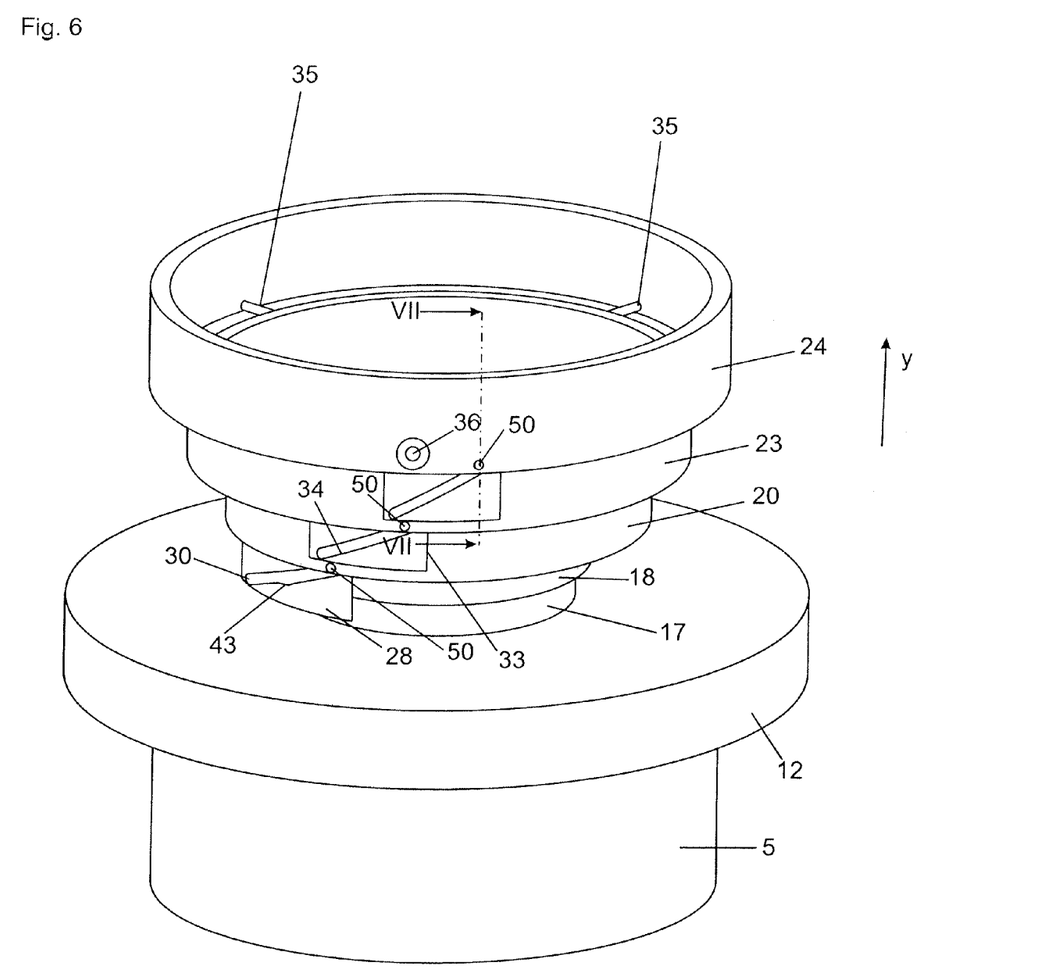
FIG. 6 is a perspective view of one more embodiment of the device of the invention.

The embodiment shown in FIG. 6 is a slight modification of the one shown in FIG. 3. In FIG. 6, the groove extensions 32 are replaced with flat portions 43. These flat portions 43 have horizontal or sloping edges, the term "sloping" referring to the counterclockwise direction of rotation. In contrast to the use of the groove extensions 32, it is not necessary to lift the nearest ring 20 in the case of these flat portions in order to reach the nearest snap-in stop. Rather, it is sufficient to apply slightly increased effort in the direction of rotation.

Instead of the support plate 28 being made to rest on the surface of the external cooling device, the support plate 28 can also be attached to the annular border 18, as shown in FIG. 6, which results in slightly reduced assembly effort.

An alternative to the pin 31 or 35 is explained by means of the exemplary embodiment shown in FIG. 6. The pins 31, 35 are replaced with guide elements 50 that are explained in more detail with reference to FIG. 7.

Figure 7:
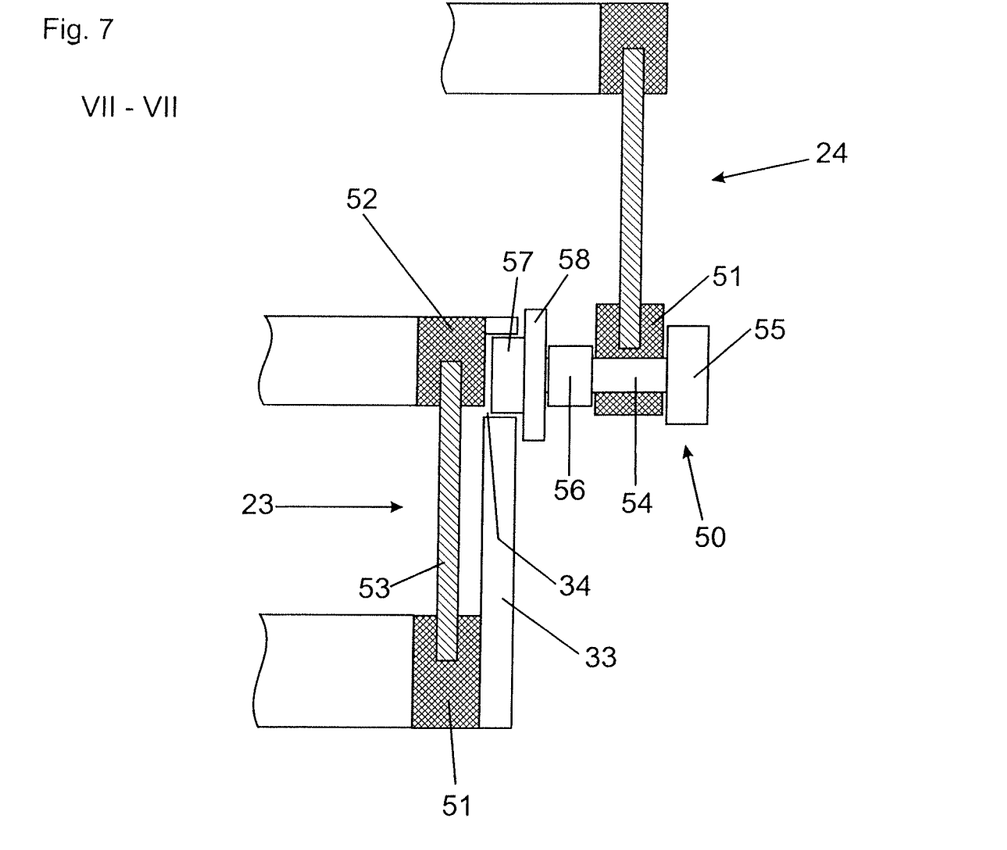
FIG. 7 is a view taken along the line VII-VII marked in FIG. 6.

FIG. 7 shows a preferred embodiment of the ring 23. The ring 23 is composed of two rings 51 and 52 that are located on top of each other and can be made of metal, for example, aluminum. Grooves, into which circular arc-shaped spacers 53 are inserted, can be made in the surfaces of these rings facing each other. Provision can be made for one circumferentially extending spacer 53; however, a plurality of spacers is also feasible that, taken together, extend around the circumference of the rings. The rings 51, 52 can be connected to each other by the plates 33 and/or further fixing elements (not shown in the figure). The spacers 53 are made of Plexiglas, for example, that is light and enables the blown film to be observed. Aluminum, being an even lighter metal, can be used for the spacers. The use of other metals such as steel is also possible for this purpose. The rings 20 and 24 can be constructed exactly like the ring 23.

The guide element 50 comprises a basic element 54 that is inserted through a bore in the ring 51 of the ring 24 and is fixed suitably. The basic element 54 can support a head 55. The basic element and the head can also be formed integrally, for example, in the form of a screw that is screwed into the ring 51. A spacer 56 is slid or screwed onto the basic element 54. Furthermore, the basic element 54 supports a guide roll 57 that can be rotated on the basic element 54, but that cannot be moved in the axial direction. This guide roll runs along the groove 34 of the plate 33 and it thus enables a movement of the ring 24 relative to the ring 23 which takes place without excessive effort. The guide roll can be made of brass, for example, or similar suitable materials so that the friction between the roller 57 and the basic element 54 is as low as possible. Ball and roller bearings can also be provided between the guide roll 57 and the basic element for this purpose. Apart from the portion that rolls in the groove 34, the guide roll also comprises a bridge 58 that has an enlarged diameter and that prevents the guide element 50 from moving in a direction relative to the groove. Since there are at least three such guide elements provided over the circumference of the ring 24, a radial movement of the ring 24 relative to the ring 23 is prevented in this way.

The embodiments shown are only examples. Features of the examples shown can be combined with each other. Other exemplary embodiments will also be readily apparent to a person skilled in the art and these could be used without going beyond the idea of the invention.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference numerals | |
|---|---|
| 1 | Device for the production of film tubes |
| 2 | Dashed line |
| 3 | Film tube |
| 4 | Annular nozzle |
| 5 | Die head |
| 6 | Internal cooling device |
| 7 | Air exhaust |
| 8 | Air flow inside the film tube |
| 9 | Air flow inside the film tube |
| 10 | Air flow inside the film tube |
| 11 | Air flow inside the film tube |
| 12 | External cooling device |
| 13 | Lifting device |
| 14 | Arrow |
| 15 | Supply pipe |
| 16 | Separator |
| 17 | Annular region |
| 18 | Annular border |
| 19 | Arrow |
| 20 | First ring |
| 21 | Adjusting device |
| 22 | Arrow |
| 23 | Ring |
| 24 | Ring |
| 25 | Double arrow |
| 26 | Arrow |
| 27 | Support |
| 28 | Support plate |
| 29 | Beveled portion |
| 30 | Groove |
| 31 | Pin |
| 32 | Groove extension |
| 33 | Plate |
| 34 | Groove |
| 35 | Pin |
| 36 | Knob |
| 37 | Support piece |
| 38 | Rod |
| 39 | Bore |
| 40 | Fixing screw |
| 41 | Toothed-ring segment |
| 42 | Shaft |
| 43 | Flat portion |
| 44 | |
| 45 | Worm gear |
| 46 | Electric motor |
| 47 | |
| 48 | |
| 49 | |
| 50 | Guide element |
| 51 | Ring |
| 52 | Ring |
| 53 | Spacer |
| 54 | Basic element |
| 55 | Head |
| 56 | Spacer |
| 57 | Guide roll |
| 58 | Enlarged bridge |
| y | Transport direction of the film tube 3 |

What is claimed is:

1. A device for producing a film tube, said device comprising:
 a die head including an annular nozzle, from which a plastic melt for producing the film tube is extruded in a transport direction (y);
 at least one fluid-application device, which is annular in shape at least in certain regions and which follows the die head in the transport direction (y) and which surrounds the film tube with an annular region via which a fluid can be guided toward the film tube;
 at least a first ring, and a second ring arranged concentrically about the first ring, with a first open annular region disposed between the first ring and the second ring, a diameter of each of the first ring and the second ring being larger than the annular region of the fluid-application device, a fluid pervious support member positioned between the first ring and the second ring configured to allow a fluid to flow into and out of the first open annular region, the first open annular region being configured to provide for pressure equalization therein between the first ring and the second ring; and
 an adjusting device, via which at least one of the first ring and the second ring is adjustable in height relative to the fluid-application device,
 the adjusting device including support members which extend in the transport direction (y) of the film tube and into which inclined guide grooves are inserted, and
 each of the first ring and the second ring including pins that engage in the inclined guide grooves.

2. The device according to claim 1, further comprising a third ring arranged concentrically around the second ring, with a second open annular region disposed between the second ring and the third ring, the third ring being adjustable in height relative to the fluid-application device and relative to the first ring and the second ring via the adjusting device.

3. The device according to claim 2, wherein each of the first ring, the second ring, and the third ring is lockable in place on an element of the device, relative to which each of the first ring, the second ring, and the third ring is adjustable in height.

4. The device according to claim 1, wherein each of the inclined guide grooves includes one or more groove extensions, in which the pins are snappable into place.

5. The device according to claim 1, wherein the adjusting device includes at least one electromotor drive.

6. The device according to claim 2, wherein each of the first ring, the second ring, and the third ring has associated therewith an electromotor drive.

7. A method of producing a film tube with a device that includes a die head having an annular nozzle, a fluid-application device, which is annular in shape at least in certain regions and which follows the die head in a transport direction (y) of the film tube and which surrounds the film tube with an annular region, a first ring and a second ring arranged concentrically about the first ring, with a first open annular region disposed between the first ring and the second ring, a diameter of each of the first ring and the second ring being larger than the annular region of the fluid-application device, the first open annular region being configured to provide for pressure equalization therein between the first ring and the second ring, and an adjusting device, via which at least one of the first ring and the second ring is adjustable in height relative to the fluid-application device, said method comprising:

extruding a plastic melt from the die head in the transport direction (y) to produce the film tube;

adjusting the height of at least one of the first ring and the second ring relative to the fluid-application device; and     guiding the fluid toward the film tube through the annular region of the fluid-application device and through the first open annular region, a fluid pervious support member positioned between the first ring and the second ring configured to allow the fluid to flow into and out of the first open annular region.

8. The method according to claim 7, wherein at least one of the first ring and the second ring is adjusted in height relative to the fluid-application device only after the start-up of the device and production of a stable blown film.

9. A device for producing a film tube, said device comprising:

a die head having an annular nozzle from which a plastic melt is extruded in a film tube transport direction (y);

a cooling fluid-application device arranged downstream of the die head in the film tube transport direction (y), the cooling fluid-application device surrounding the film tube with an annular region via which a cooling fluid is guidable toward the film tube;

a first ring arranged concentrically around the annular region of the fluid-application device, and a second ring arranged concentrically around the first ring, with a first open annular region being disposed between the first ring and the second ring, the first open annular region being configured to provide for pressure equalization therein between the first ring and the second ring; and     an adjusting device that adjusts a height of at least one of the first ring and the second ring relative to the fluid-application device,     the first open annular region being configured such that flow of the cooling fluid in the film tube transport direction (y) between the first ring and the second ring results in a negative pressure therein, so as to provide for an increased flow of the cooling fluid and an enhanced cooling of the film tube, a fluid pervious support member positioned between the first ring and the second ring configured to allow the cooling fluid to flow into and out of the first open annular region.

10. The device according to claim 9, further comprising a third ring arranged concentrically around the second ring, with a second open annular region being disposed between the second ring and the third ring.

11. The device according to claim 9, wherein the height of the at least one of the first ring and the second ring is adjusted upward in the film tube transport direction (y).

12. The device according to claim 10, wherein an adjusted height of the second ring is higher than an adjusted height of the first ring, and an adjusted height of the third ring is higher than an adjusted height of the second ring.

13. The device according to claim 10, wherein the heights of the first ring, the second ring, and the third ring are individually adjustable.

14. The device according to claim 10, wherein the second ring is supported on the first ring, and the third ring is supported on the second ring.

15. The device according to claim 13, wherein the second ring is supported by the fluid pervious support member, and the third ring is supported by another fluid pervious support member, so as to facilitate the flow of the cooling fluid therethrough.

\* \* \* \* \*